(12) United States Patent
Gul

(10) Patent No.: US 6,457,857 B1
(45) Date of Patent: Oct. 1, 2002

(54) SHEATHED AND FLANGED TEMPERATURE PROBE

(75) Inventor: S. Asim Gul, Orono, MN (US)

(73) Assignee: Mamac Systems, Inc., Eden Prairie, MN (US)

( * ) Notice: Subject to any disclaimer, the term of this patent is extended or adjusted under 35 U.S.C. 154(b) by 0 days.

(21) Appl. No.: 09/635,034

(22) Filed: Aug. 4, 2000

(51) Int. Cl.$^7$ .......................... G01K 1/108; G01R 3/00; H01R 43/04; B21D 39/03; B23P 11/00
(52) U.S. Cl. .......................... 374/208; 29/595; 29/862; 29/428; 29/516; 73/866.5
(58) Field of Search .................... 374/208, 209, 374/163; 29/515, 516, 428, 595, 861, 862; 72/335, 327; 136/201, 230, 232, 233, 234; 174/89, 84 C; 338/22 R, 28, 226, 315; 73/866.5

(56) References Cited

U.S. PATENT DOCUMENTS

| | | | | |
|---|---|---|---|---|
| 3,811,958 A | * | 5/1974 | Maurer | 136/233 |
| 4,018,462 A | * | 4/1977 | Saka | 29/516 |
| 4,055,067 A | * | 10/1977 | Kozima | 72/335 |
| 4,291,576 A | * | 9/1981 | Deane | 374/155 |
| 4,453,835 A | * | 6/1984 | Clawson et al. | 374/208 |
| 4,491,680 A | * | 1/1985 | Manecke | 374/208 |
| 4,688,039 A | * | 8/1987 | Berk | 374/179 |
| 5,159,826 A | * | 11/1992 | Miyazawa et al. | 72/335 |
| 5,178,009 A | * | 1/1993 | Arekapudi et al. | 374/142 |
| 5,781,098 A | * | 7/1998 | Shibata | 338/28 |

* cited by examiner

Primary Examiner—Diego Gutierrez
Assistant Examiner—Stanley J. Pruchnic, Jr.
(74) Attorney, Agent, or Firm—Kinney & Lange, P.A.

(57) ABSTRACT

A sheathed and flanged temperature probe is formed using a cylindrical sheath and a flange of the same metallic material. The cylindrical sheath is closed on one end and open on the other, and has a length at least an order of magnitude greater than its outer diameter. The temperature sensing element is inserted into the sheath, leaving wires protruding from the open end of the sheath. The sheath may contain an epoxy in the closed end to insulate and stabilize the sensing element. The central portion of the sheath remains empty except for wires connecting the sensing element to the electrical leads. The open end of the sheath is sealed around two electrical leads, enclosing the temperature sensing element from ambient conditions. The flange member is formed from a single piece of metal, cold drawn using an awl to form a continuous sleeve having an axis perpendicular to the planar surface of the flange. The sheath is inserted into the sleeve. The flange is secured to the central portion of the sheath solely using a press crimper, pressing inward over a majority of the circumference of the sleeve, leaving crimp edges extending on opposite sides of the sleeve. At least one planar surface of the flange may be sealed with a gasket.

27 Claims, 4 Drawing Sheets

SHEATHED AND FLANGED TEMPERATURE PROBE

CROSS-REFERENCE TO RELATED APPLICATION(S)

None.

BACKGROUND OF THE INVENTION

The present invention relates to temperature sensors, and more particularly, to temperature sensor probes having a metallic sheath and which can be readily attached relative to a wall structure. The present invention relates both to the structure and to the method of making such temperature sensors probes.

Numerous temperature sensor structures are known in the prior art. One simple type of temperature sensor is a thermocouple, wherein two dissimilar metals are joined together, typically at the end of wires of each of the types of metal, so that an electrical voltage is generated between the points of contact as a function of the temperature sensed. A second type of temperature sensitive element is a "thermistor", having an element whose electrical resistance changes as a function of temperature. Other types of temperature sensitive elements are also known in the art.

Often it is desired to extend the temperature sensitive element into a fluid flow, such as into the center of an air flow duct, into the center of a liquid flow pipe, into a wind or from a moving vehicle. The support structure for the temperature sensitive element should disrupt the flow as little as possible, but must be strong enough to withstand the drag of the flow. A metallic sheath is a common component of temperature probes used to support the temperature sensitive element. Sheathed temperature probes commonly include a long, thin cylindrical metallic sheath which houses the temperature sensitive element and extends into the flow. Common sheathed temperature probes include lengths ranging from about 2 ½ to 12 inches and outer diameters ranging from about ⅛ to ⅜ of an inch.

Often it is desired to attach the sheathed temperature probe to a wall or other support structure. The cylindrical sheath does not facilitate attachment, so it has been common to attach a flange extending normal to the sheath. The flange must securely attach to the sheath and durably support moments placed on the sheath by the fluid flow. The flange should facilitate attachment to the support wall, such as with fastener openings.

As the temperature probe industry matures and temperature probes are designed into more and more applications, the cost of temperature probes has declined. At the same time, further cost reductions will allow temperature probes to be designed into additional applications. The cost of the flange and the attachment method adds significant costs to the temperature probe assembly. Added costs become more significant as the overall price of temperature probes declines. A less costly and more durable structure and method is needed for flanged and sheathed temperature probes.

BRIEF SUMMARY OF THE INVENTION

The present invention is a sheathed and flanged temperature probe formed using a cylindrical sheath and a flange of the same metallic material. The cylindrical sheath has a length at least an order of magnitude greater than its outer diameter. The temperature sensing element is contained within the sheath, with electrical leads protruding from the open end of the sheath. The flange member is formed from a single piece of metal, cold drawn using an awl to form a continuous sleeve having an axis perpendicular to the planar surface of the flange. The sheath is inserted into the sleeve. The flange is secured to the sheath solely using a press crimper, pressing inward over a majority of the circumference of the sleeve, leaving crimp edges extending on opposite sides of the sleeve. In a preferred embodiment, at least one planar surface of the flange may be sealed with a gasket.

By using the same material for the flange and the sheath, the materials share the same coefficient of expansion. The attachment will not be compromised by changes in temperature. Further, the crimp attachment is more durable than prior art attachments. The entire assembly process costs much less, takes less time, and involves fewer parts.

BRIEF DESCRIPTION OF THE DRAWINGS

FIG. 5A is a perspective view of the flanged and sheathed temperature probe of the present invention.

FIG. 7 is a cross-sectional showing crimping of the sheathed of the flanged member around the sheath according to the present invention.

While the above-identified FIGS. 2–8 set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
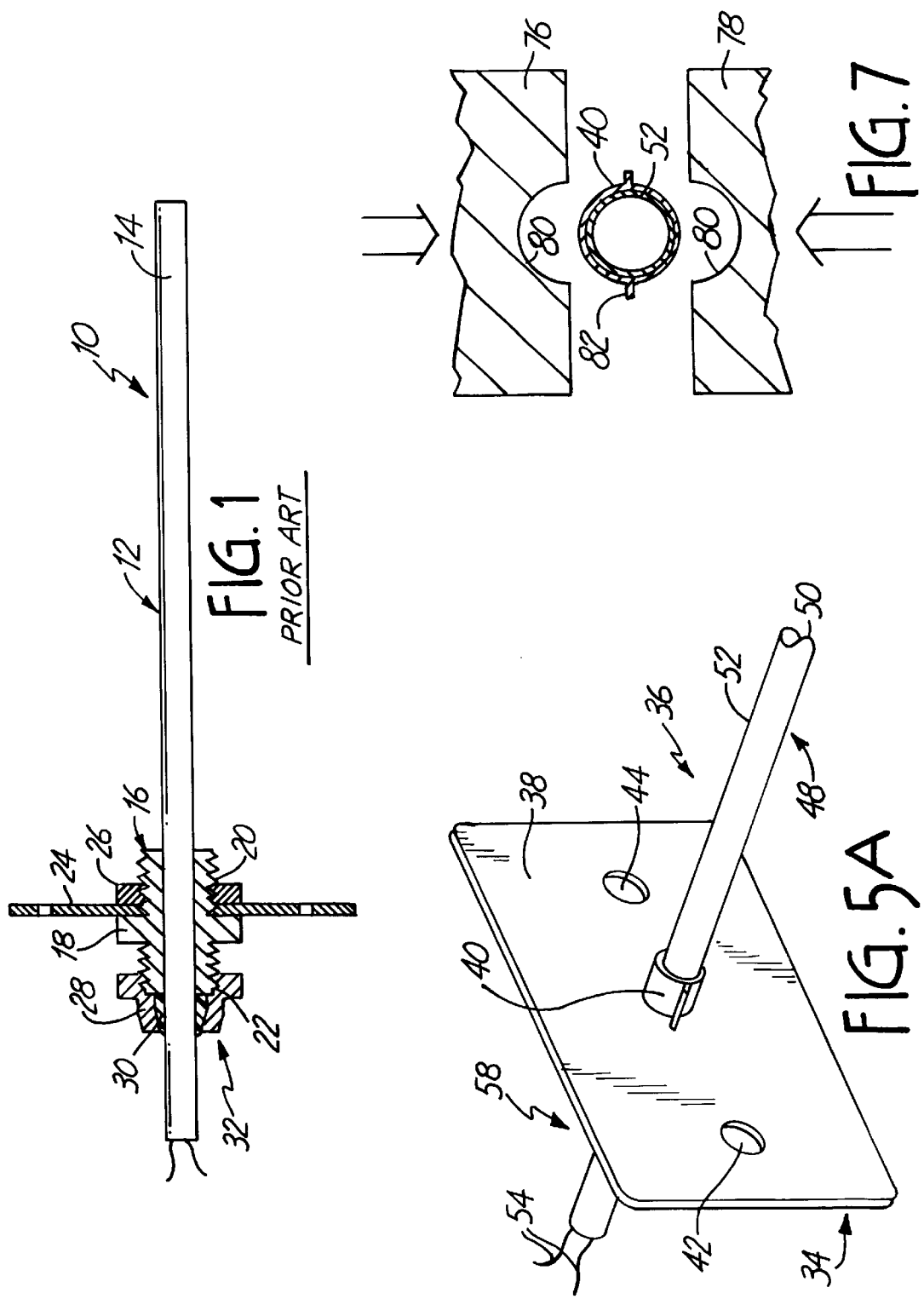
FIG. 1 is a cross-sectional view of a flanged and sheathed temperature probe of the prior art.

FIG. 1 shows a flanged and sheathed temperature probe 10 of the prior art. A cylindrical sheath 12 houses a temperature sensing element 14 as known in the art. A fitting 16 is placed on the cylindrical surface of a sheath 12. The fitting 16 has an inner diameter which matches the outer diameter of the sheath 12. The fitting 16 has a head 18 to support a rotational force, such as a hexagonal head 18, which can be received in a standard wrench. The fitting 16 has threaded ends 20,22 extending from both sides of the head 18. The fitting 16 has a length which permits transfer of a substantial moment to the sheath 12, so the sheath 12 can withstand the drag of the flow without deflection. For example, the fitting 16 for a ¼ outer diameter sheathed temperature probe 10 may be about 1 inch long.

A flange 24 is attached to the fitting 16 by placing the sheet metal flange 24 and a threaded nut 26 over the threaded end 20. The nut 26 is rotationally tightened relative to the fitting 16 to secure the flange 24 between the nut 26 and the head 18. The nut 26 and the head 18 contact enough of the flange 24 to securely hold the flange 24 relative to the fitting 16. For instance, the head 18 and the nut 26 may be ½ or ⅝ inch in diameter.

The inner diameter of the fitting 16 has a clearance with respect to the outer diameter of the sheath 12, allowing the fitting 16 to slide up and down the sheath 12. To secure the fitting 16 to the sheath 12, a compression nut 28 is tightened on opposite threaded end 22 of the fitting 16. The compression nut 28 presses a compression ferrule 30 against the sheath 12 and against the fitting 16. Both the nut 26 and compression nut 28 are shaped to be received in a tool, such as with a hexagonal outer profile.

The fitting 16, nut 26 and compression nut 28 are commonly formed of brass or steel and available from numerous suppliers. The compression ferrule 30 should be formed of a soft material, such as nylon. The flange 24 may be formed out of any appropriately strong sheet stock, such as punched out of 1/16 thick stainless steel. While all five elements of the flange assembly 32 (the fitting 16, the nut 26, the flange 24, the compression nut 28 and the compression ferrule 30) are each common and low cost, the combined cost and the assembly cost for these elements is substantial. Particularly when used with a low cost sheathed temperature probe 10, the cost of the flange assembly 32 may represent a significant fraction of the overall product cost.

Other prior art flanged and sheathed temperature probes (not shown) include designs where one or all of the fitting 16, nut 26, compression nut 28 and compression ferrule 30 are replaced with one or several molded plastic components. The molded plastic components are low cost on a per unit basis, but are not generally commercially available and may have to be custom designed and made with custom molds. Plastic components also have strength and durability problems.

The present invention includes a flange member 34 placed around a sheathed probe 36. The flange member 34 is detailed in FIGS. 2 and 3, and includes a flange 38 and a sleeve 40. The sleeve 40 is cylindrical for placement around a sheathed temperature probe 36 as shown in FIG. 5A.

The flange 38 is generally planar, and extends generally normal to the axis of the sleeve 40. The flange member 34 supports the sheathed temperature probe 36 and allows the sheathed temperature probe 36 to withstand drag from the flow into which the temperature probe 36 projects. The flange member 34 should further have a significant margin of error of additional support strength, such that the temperature probe 36 will not break loose or bend from the wall even if accidentally bumped or contacted. To provide the necessary support, the flange 38 extends a significant distance away from the axis of the sleeve 40. For example, the flange 38 should extend beyond the diameter of the sleeve 40 for a distance of at least another two diameters. That is, if the sleeve 40 is designed to fit a ¼ inch diameter sheathed temperature probe 36, the flange 38 should extend at least ½ inch from the sleeve 40, preferably on opposite sides. This extension allows the flange 38 to withstand significant moments placed on the sleeve 40 by the sheathed probe 36. In the preferred embodiment, the flange 38 is about 2 inches long and 1 inch high. The preferred flange 38 is formed of sheet steel about 1/16 of an inch thick. If other materials are used, appropriate dimensional changes can be made so the flange member 34 can still withstand significant loads/moments placed on the sheathed temperature probe 36 without bending. In the preferred embodiment, a gasket 41 (shown in FIG. 5B) may be placed on a planar surface of the flange 38 to define a seal against the mounting surface. The gasket 41 may provide a compressible cushion, allowing the flange 38 member to withstand additional loads/moments placed on the sheathed temperature probe 36 without bending. The gasket 41 also may permit a pressure tight seal between the flange 38 and the supporting wall.

The cylindrical sleeve 40 must extend axially from the flange 38 for a significant length, such as 1% or more the length of the probe 36. For a sheet metal flange 38 as in the preferred embodiment, the sleeve 40 extends twice or more the thickness of the flange 38. This axial length of the sleeve 40 is long enough distance to transmit a corresponding moment to the temperature probe 36 and to hold the temperature probe 36 securely in place. The wall thickness of the sleeve 40 must also provide sufficient strength. However, with the sleeve 40 formed continuously and unitarily with the flange 38, the wall thickness of the sleeve 40 can be minimized, such as to a thickness which is less than half a thickness of the sheet stock, and still be sufficiently strong. In the preferred embodiment, the sleeve 40 extends about ⅛ of an inch from the surface of the flange 38, and has a wall thickness of about 20 mils.

Fastener holes 42,44 are positioned on the flange 38 a significant distance away from the sleeve 40. In the preferred embodiment, there is about an inch and half spacing between centers of the fastener holes 42,44, such that each fastener has a moment arm of ¾ of an inch on the sheathed temperature probe 36. The fastener holes 42,44 can be formed into the flange 38 as known in the art, such as through punching or drilling. The fastener holes 42,44 facilitate attachment of the flange member 34 to a support wall (not shown) such as with screws or bolts (not shown). If other means of attachment between the flange member 34 and the support wall will be used, the flange 38 can be appropriately modified.

Figure 4:
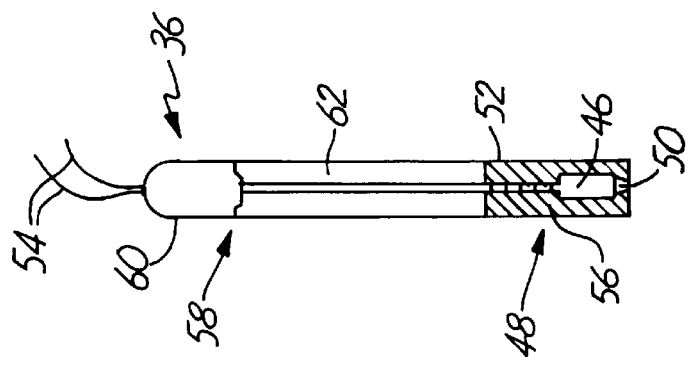
FIG. 4 is a cross-sectional view of a representative sheathed temperature probe in the present invention.
Figure 5B:
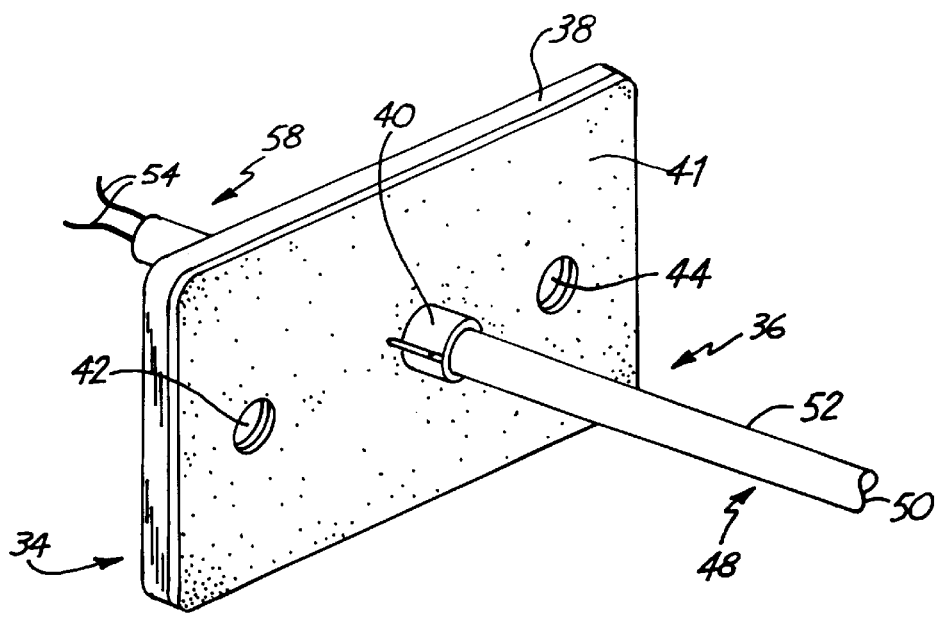
FIG. 5B is a perspective view of the flanged and sheathed temperature probe of FIG. 5A with a gasket.
Figure 8:
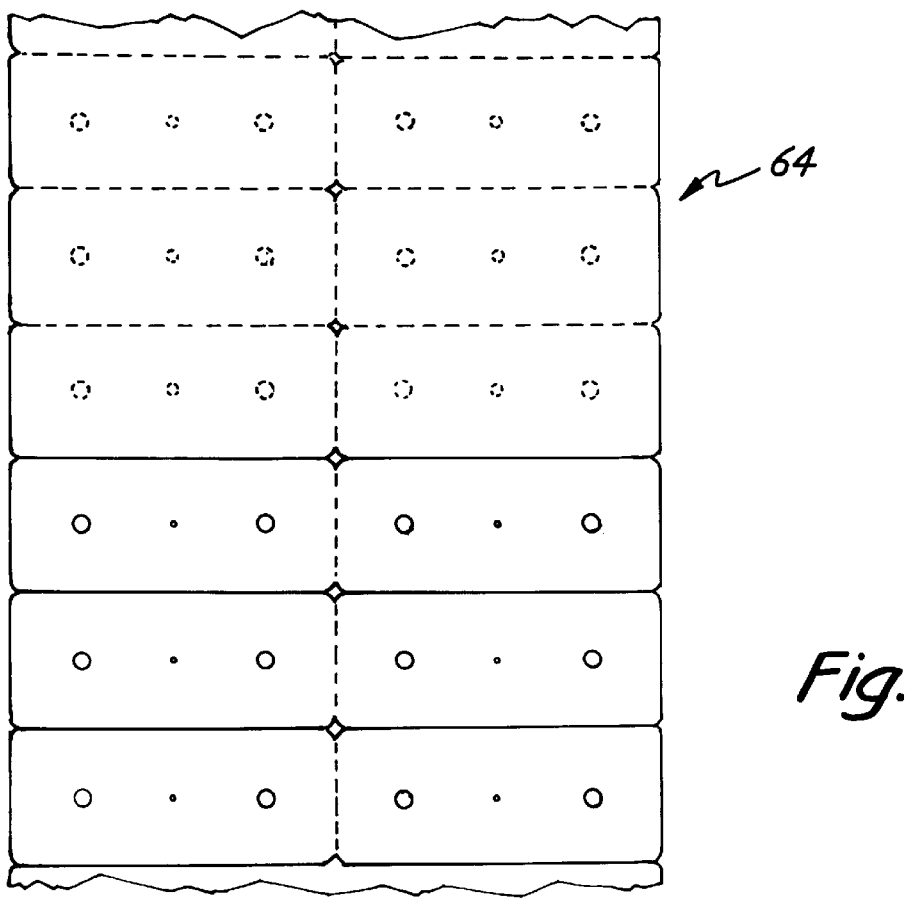
FIG. 8 is a top plan view of the sheet stock used to manufacture the flange member in the present invention.

FIG. 4 shows the temperature probe 36 in cross section, without the flange member 34. The temperature sensitive element 46 is positioned at the distal end 48 of the probe 36. The temperature sensitive element 46 may be in contact with the end surface 50 of the sheath 52, and sense temperature via thermal conductivity through the sheath 52. Alternatively, the temperature sensitive element 46 may be project slightly beyond the end surface 50 of the sheath 52, or be slightly removed inside the sheath 52.

The preferred temperature sensitive element 46 is a thermistor which changes its electrical resistance based on its temperature. Lead wires 54 are connected to the thermistor 46 and extend the length of the temperature probe 36. The electrical resistance between the leads 54 is indicative of sensed temperature.

The thermistor 46 may be encapsulated such as in epoxy within the sheath 52. The epoxy encapsulation 56 ensures a good thermal conductivity connection between the sheath 52 and the thermistor 46. The epoxy encapsulation 56 also helps prevent damage to the thermistor 46 due to handling of the probe 36. In the preferred embodiment, the epoxy encapsulation 56 extends over the final two inches or so on the distal end 48 of the temperature probe 36.

The proximal end 58 of the sheath 52 is sealed such with an ultraviolet cured epoxy seal 60. This seal 60 provides strain relief for the leads 54. In the preferred embodiment, the strain relief seal 60 extends over the proximal end 58 of the sheath 52 for about ½ inch. Many other types of strain relief may be alternatively provided, but the epoxy strain relief seal 60 within the sheath 52 supports the sheath 52 during attachment of the flange member 34.

The sheath 52 is formed into a metallic cylinder as known in the art. The sheath 52 can have a length as known in the art, which is at least an order of magnitude greater than the outer diameter. Lengths such as from about 3 to 12 inches long can be used for a ¼ inch diameter probe 36. Between the encapsulation 56 and the strain relief seal 60 there is an unfilled or substantially hollow section 62 in the middle of the sheath 52. With the preferred construction, this hollow section 62 may have a length from ½ inch to about 9 ½ inches. This central section 62 provides some thermal insulation so the temperature sensitive element 46 is affected as little as possible with the temperature of the wall to which the temperature probe 36 is attached.

Figure 2:
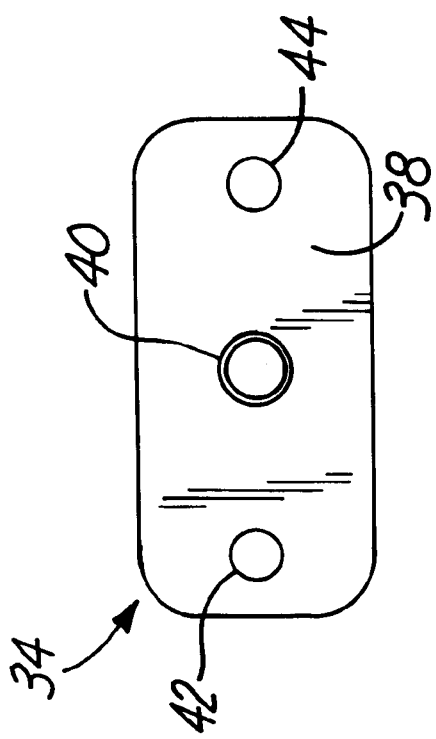
FIG. 2 is a elevational view of the flange member of the present invention.
Figure 3:
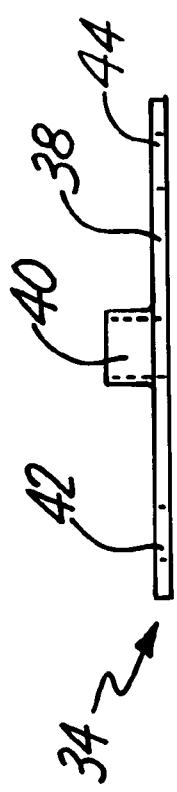
FIG. 3 is a side view of the flange member of FIG. 2.
Figure 6:
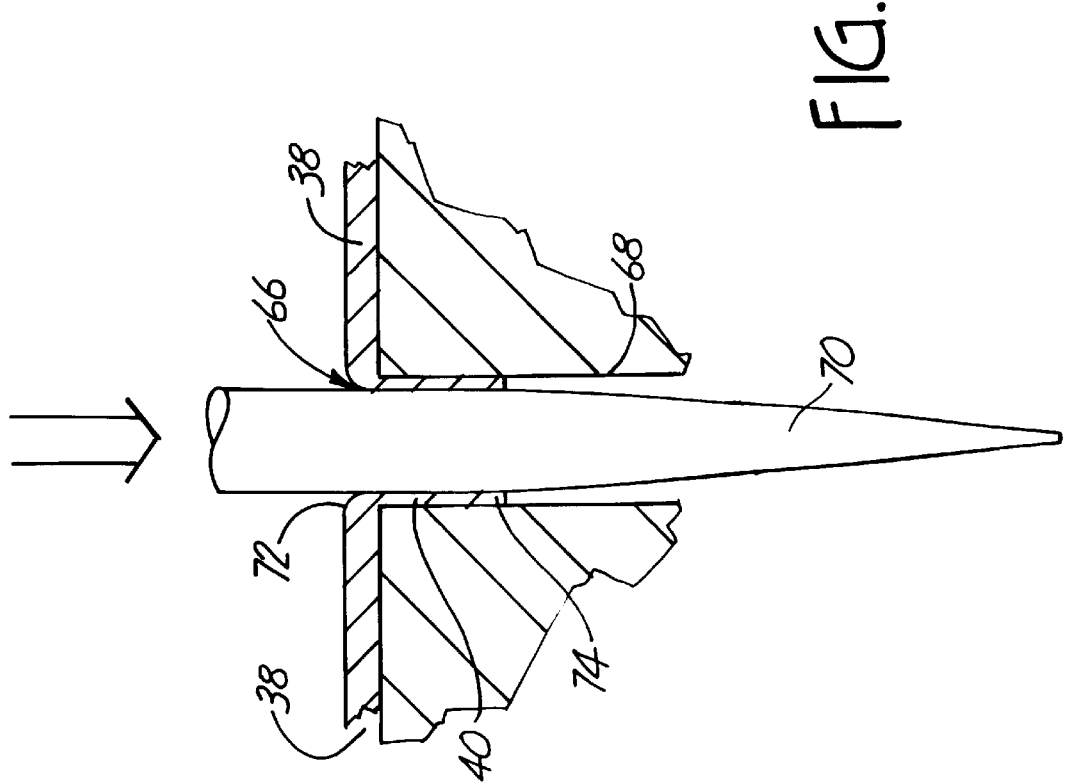
FIG. 6 is a cross-sectional view showing manufacture of the flanged member of the present invention.

FIGS. 6 and 7 detail the preferred method for forming the flange member 34 of FIGS. 2 and 3 and attaching the flange member 34 to the sheathed temperature probe 36 of FIG. 4. The flange member 34 is formed from common sheet stock 64 of appropriate thickness for the requisite strength. For stainless steel, the preferred thickness is about 1/16 of an inch for ¼ inch probes 36. Workers skilled in the art will appreciate how to select the appropriate sheet stock thickness based upon probe size and material used. The outer shape of the flange 38 and the fastener holes 42,44 can be formed by any known method, such as stamping, punching, drilling or other machining operations.

Additionally, a small hole 66 (shown only enlarged around the awl 70 in FIG. 6) can be formed defining the eventual axis of the sleeve 40. The hole 66 is preferably circular to form a cylindrical sleeve 40. The hole 66 should be quite small, so as to remove as little material as possible. For instance, the circular hole 66 should have a diameter less than half the desired inner diameter of the sleeve 40, i.e., less than half the outer diameter of the sheathed probe 36.

After formation of the initial hole 66, the sheet stock 64 is then processed in a cold deep draw to form the sleeve 40. The sheet stock 64 is positioned with the circular hole 66 centered over a cylindrical opening 68 in a fixture. The cylindrical opening 68 in the fixture has an inner diameter which matches the desired outer diameter of the sleeve 40. As shown in FIG. 6, an awl 70 is axially advanced through the circular hole 66 to press the sheet stock 64 around the circular hole 66 into the cylindrical sleeve 40. The awl 70 must be precisely centered relative to the fixture opening 68 to form a uniformly cylindrical sleeve 40. Even for small sleeves 40, a fairly large tonnage force is required for the awl 70, dependent upon the sheet metal thickness and material being processed and the shape of the awl 70. As can be seen in FIG. 6, the awl 70 "pulls" material surrounding the sleeve 40 inward during the drawing operation, such that the material at the bottom corner 72 is less than full sheet thickness.

The dimensional parameters of the awl 70, the initial circular hole 66, the fixture opening 68 and the final sleeve 40 are all interrelated. If one approximates that the decrease in material thickness at the bottom corner 72 corresponds to half the wall thickness of the sleeve 40, the approximate volume of material deformed by the awl 70 to form the sleeve 40 is:

$$(\pi/4)(\text{sheet thickness})((\text{sleeve average diameter})^2-(\text{initial circular hole diameter})^2)$$

The minimum volume of material required for the desired sleeve 40 is:

$$(\pi/4)(\text{sleeve length})((\text{sleeve outer diameter})^2-(\text{sleeve inner diameter})^2)$$

For the preferred embodiment having a sheet thickness of 0.062 inches, a sleeve inner diameter of 0.255 inches, a sleeve length of 0.2 inches, and a sleeve outer diameter of 0.295 inches, one can solve for a maximum initial circular hole 66 diameter of 0.068 inches. It is preferred to form the initial circular hole 66 even slightly smaller, so material at the end 74 of the sleeve 40 can be ground slightly to remove any sharp edges and provide a visually appealing, planar annular face 74 to the sleeve 40. With these parameters, it has been found that an adequately strong, well formed sleeve 40 can be formed by the described cold deep draw process.

The preferred sleeve 40 is formed with an inner diameter with a slight clearance over the outer diameter of the sheath 52, thereby permitting sliding movement of the sleeve 40 along the sheath 52 during assembly. In the assembly process, the flange member 34 is slid along the sheath 52 until positioned in the proper axial location. The preferred clearance between the inner diameter of the sleeve 40 and the outer diameter of the sheath 52 is about 5 mils.

The preferred method for axially securing the flange member 34 to the sheathed probe 36 is by a press crimp as shown in FIG. 7. The press crimper includes opposing press blades 76,78, each of which have a part-cylindrical profile 80. The opposing press blades 76,78 have a thickness corresponding to the axial amount of sleeve 40 to be press crimped, such as in the preferred embodiment 0.2 inches. The part-cylindrical profile 80 preferably defines a diameter which will cause deformation of both the sleeve 40 and the underlying sheath 52. In the preferred embodiment, wherein the initial outer diameter of the sleeve 40 is about 0.295 inches, the initial inner diameter of the sleeve 40 is about 0.255 inches, and the initial outer diameter of the sheath 52 is about 0.250 inches, each press blade defines a cylindrical diameter of about 0.275 inches. The 20 mil wall thickness of the sleeve 40, when crimped to an outer diameter of 0.275 inches, causes the sheath 52 to deform inward to a diameter of roughly 0.235 inches.

The press blades 76,78 are pressed together to deform the sleeve 40. Crimp squeezes 82 are squeezed outward between the press blades 76,78, such as at opposing 180° locations. In the preferred embodiment, about 7500 pounds of force are used as shown in FIG. 7 to press crimp the flange member 34 on the temperature probe sheath 52.

The preferred press crimper solves several potential problems to form a surprisingly effective and robust attachment between the sleeve 40 and the sheath 52. First, it is important that the press crimper form the crimp squeeze locations 82. In contrast to pressing inward uniformly throughout 360° (i.e. such as in a conventional press fit), the press crimper pushes from two sides to deform material out at the opposing crimp squeezes 82. That is, the circumferential length of material at the inside diameter of the sleeve 40 is not compressed radially inward, but rather material at the crimp squeezes 82 is folded out so it no longer contributes to the effective circumference. This causes a reduction in diameter, without residual internal compressive stresses, which does not "bounce back".

The crimp press should contact and press the sleeve material together over a majority of the circumference of the sleeve 40. In the preferred embodiment, the crimp press blades 76,78 make substantially complete contact over all but a few degrees of the circumference of the sleeve 40 for the opposing crimp squeezes 82. This is in contrast to a star shaped crimp like a conventional bottle cap, wherein a number of points are deflected inward but much of the cap circumference is not crimped. By making contact over a majority of the circumference of the sleeve 40, the sleeve 40 compresses nearly 360 of the sheath 52 uniformly inward, for more secure holding power and less potential movement between the sleeve 40 and the sheath 52.

With the press crimping of the present invention, no other attachment is necessary. No threads need be cut, and no use of rotational tools is required. No adhesive is used, avoiding the mess of adhesives, the cost of adhesive, and potential outgassing problems. Further, both the metal sleeve 40 and the metal sheath 52 neither corrode nor degrade over time, and the connection is significantly unaffected by aging. Additionally, no compression nuts, nuts or other pieces need to be cut, reducing the number of pieces and steps required for assembly.

The radially inward hoop strength of the sleeve 40 and the sheath 52 should be at least on the same order of magnitude. If the flange member 34 and the sheath 52 are formed of the same material, the wall thickness of the sleeve 40 and the sheath 52 should be on the same order of magnitude, and thus respond with an equal stress and roughly equal deflection responsive to the force of the crimp press. This is in contrast with the prior art of FIG. 1 wherein the threaded fitting 16 has a wall thickness which is an order of magnitude greater than the wall thickness of the sheath 12. In the preferred embodiment, the sleeve 40 has a wall thickness which is equal to the wall thickness of the sheath 52, as best shown in FIG. 7. In the preferred embodiment both the sheath 52 and the sleeve 40 have a wall thickness of about 0.02 inches and both are formed of 304 stainless steel. Thus the sleeve 40 and the sheath 52 both deflect radially inward and roughly share the load imparted by the crimp press. By both sharing the load of the crimp press, the residual stress of the sheath 52 outward on the sleeve 40 is bourne by the sleeve 40 without too much deformation of the sleeve 40, and thus the residual stress can be maintained to securely attach the flange member 34 to the sheath 52 over a prolonged period of time. Because the sleeve 40 and the sheath 52 are both formed of the same material, they both have the same coefficient of thermal expansion, and thermal cycling does not significantly change the imparted stress between the sleeve 40 and the sheath 52 over time.

Although the present invention has been described with reference to preferred embodiments, workers skilled in the art will recognize that changes may be made in form and detail without departing from the spirit and scope of the invention.

What is claimed is:

1. A method of forming a sheathed and flanged temperature probe, comprising:

placing a temperature sensing element within a metallic sheath, the sheath being cylindrical with an outer diameter, the sheath having a length which is at least an order of magnitude greater than the outer diameter;

integrally forming a flange member from a single, unitary piece of metal sheet stock, the flange member having a planar flange and a continuous cylindrical sleeve defining an axis extending normal to the flange, the sleeve having an inner diameter sized to receive the outer diameter of the sheath, the flange defining fastener openings spaced from the sleeve;

inserting the sheath into the sleeve of the flange member; and press crimping the sleeve onto the sheath to secure the flange member to the sheath.

2. The method of claim 1, wherein the press crimping forms a press crimp pressing inward over a majority of the circumference of the sleeve.

3. The method of claim 2, wherein the press crimping is performed with two opposing 180° semi-cylindrical presses which squeeze the sleeve outward at opposing crimp squeeze locations.

4. The method of claim 1, further comprising:

affixing a gasket over the planar flange.

5. The method of claim 1, wherein the act of placing the temperature sensing element within the metallic sheath comprises;

attaching lead wires to the temperature sensing element;

positioning the temperature sensing element in a first end of the sheath with the lead wires in the sheath extending a majority of the sheath's length; and affixing the temperature sensing element in the first end of the sheath with epoxy fill, thereby forming a thermally conductive path from the first end of the sheath to the temperature sensing element, while retaining a central portion of the sheath unfilled;

and wherein the sleeve is press crimped onto the unfilled central portion of the sheath, such that the temperature sensing element is separated from the flange by at least part of the unfilled central portion of the sheath.

6. The method of claim 1, wherein the sheath and the flange member are formed of the same type of metal, such that both the sheath and the flange member exhibit the same coefficient of thermal expansion.

7. The method of claim 6, wherein both the sheath and the flange member are formed of stainless steel.

8. The method of claim 1, wherein the sheath has a wall thickness which is no less than half a wall thickness of the sleeve.

9. The method of claim 1, further comprising forming fastener openings spaced at least ¼ inch from an outer diameter of the sleeve.

10. The method of claim 1, wherein the planar flange encircles the sleeve such that the planar flange extends normal to the axis throughout 360°.

11. The method of claim 1, wherein the sleeve is press crimped in direct contact with the sheath.

12. A sheathed and flanged temperature probe, comprising:

a temperature sensing element within a metallic sheath, the sheath being cylindrical with an outer diameter, the sheath having a length which is at least an order of magnitude greater than the outer diameter;

a flange member integrally formed from a single, unitary piece of metal sheet stock, the flange member having a planar flange and a continuous sleeve having an axis extending normal to the planar flange, the sleeve being secured onto the sheath with a press crimp.

13. The sheathed and flanged temperature probe of claim 12, wherein the sleeve is squeezed outward at two opposing squeeze locations positioned 180° around the circumference of the sleeve.

14. The sheathed and flanged temperature probe of claim 12, wherein the cylindrical sleeve has a length projecting from the flange which is more than twice a thickness of the flange, and wherein the cylindrical sleeve has a wall thickness which is less than half the thickness of the flange.

15. The sheathed and flanged temperature probe of claim 12 wherein the sheath and the flange member are formed of the same type of metal, such that both exhibit the same coefficient of thermal expansion.

16. The sheathed and flanged temperature probe of claim 12, wherein the sheath has a wall thickness which is no less than half a wall thickness of the sleeve.

17. The sheathed and flanged temperature probe of claim 12, wherein the press crimp presses inward over a majority of the circumference of the sleeve, and wherein the sleeve is secured onto the sheath solely with the press crimp.

18. The sheathed and flanged temperature probe of claim 12, wherein the planar flange encircles the sleeve such that the planar flange extends normal to the axis throughout 360°.

19. The sheathed and flanged temperature probe of claim 12, wherein the sleeve is in direct contact with the sheath.

20. A method of forming a sheathed and flanged temperature probe, comprising:

placing a temperature sensing element within a metallic sheath, the sheath being cylindrical with an outer diameter, the sheath having a length which is at least an order of magnitude greater than the outer diameter;

integrally forming a flange member from a single, unitary piece of metal, wherein the act of forming a flange member comprises:

forming a planar flange out of sheet stock; and cold drawing a cylindrical sleeve out of the sheet stock, the cylindrical sleeve being continuous and defining an axis extending normal to the flange, the sleeve having an inner diameter sized to receive the outer diameter of the sheath, the flange defining fastener openings spaced from the sleeve;

inserting the sheath into the sleeve of the flange member; and press crimping the sleeve onto the sheath to secure the flange member to the sheath.

21. The method of claim 20, wherein the cold drawing act comprises:

opening a circular hole into the sheet stock, the circular hole having a diameter less than half the outer diameter of the sheath;

positioning the sheet stock with the circular hole centered over a cylindrical opening in a fixture; and axially advancing an awl through the circular hole to press the sheet stock around the circular hole into the cylindrical sleeve.

22. The method of claim 20, wherein the cylindrical sleeve has a length projecting from the flange which is more than twice a thickness of the sheet stock.

23. The method of claim 20, wherein the cylindrical sleeve has a wall thickness which is less than half a thickness of the sheet stock.

24. The method of claim 20, wherein the press crimping forms a press crimp pressing inward over a majority of the circumference of the sleeve, wherein the press crimp is formed with two opposing 180° semi-cylindrical presses which squeeze the sleeve outward at opposing crimp squeeze locations.

25. A method of forming a sheathed and flanged temperature probe, comprising:

placing a temperature sensing element within a metallic sheath, the sheath being cylindrical with an outer diameter, the sheath having a length which is at least an order of magnitude greater than the outer diameter;

integrally forming a flange member from a single, unitary piece of metal, comprising:

forming a planar flange out of sheet stock;

opening a circular hole into the sheet stock, the circular hole having a diameter less than half the outer diameter of the sheath;

positioning the sheet stock with the circular hole centered over a generally cylindrical opening in a fixture; and axially advancing an awl through the circular hole to cold press the sheet stock around the circular hole into a continuous cylindrical sleeve with an axis extending normal to the flange, the sleeve having an inner diameter sized to receive the outer diameter of the sheath, wherein the cylindrical sleeve has a length projecting from the flange which is more than twice a thickness of the sheet stock, and wherein the cylindrical sleeve has a wall thickness which is less than half the thickness of the sheet stock;

defining fastener openings spaced from the sleeve;

inserting the sheath into the sleeve of the flange member; and securing the sleeve onto the sheath.

26. A method of forming a sheathed and flanged temperature probe, comprising:

placing a temperature sensing element within a metallic sheath, the sheath being cylindrical with an outer diameter, the sheath having a length which is at least an order of magnitude greater than the outer diameter;

integrally forming a flange member from a single, unitary piece of metal, the flange member having a planar flange and a continuous cylindrical sleeve defining an axis extending normal to the flange, the sleeve having an inner diameter sized to receive the outer diameter of the sheath, the flange defining fastener openings spaced from the sleeve;

inserting the sheath into the sleeve of the flange member; and press crimping the sleeve onto the sheath to secure the flange member to the sheath, the press crimping pressing the sleeve inward in a circular profile to define an effective crimped inner diameter which is no greater than the original outer diameter of the sheath, with a majority of the circumference of the sleeve defining a generally constant diameter circle having the effective crimped inner diameter, the press crimping squeezing the sleeve outward at least one squeeze location such that the squeeze location is removed from the effective crimped inner diameter of the sleeve.

27. A sheathed and flanged temperature probe, comprising:

a temperature sensing element within a metallic sheath, the sheath being cylindrical with an outer diameter, the sheath having a length which is at least an order of magnitude greater than the outer diameter;

a flange member integrally formed from a single, unitary piece of metal, the flange member having a planar flange and a continuous sleeve having an axis extending normal to the planar flange, the sleeve being secured onto the sheath solely with a press crimp, wherein the press crimp presses inward in a circular profile over a majority of the circumference of the sleeve, with at least one squeeze location pressed outward from the sheath such that the squeeze location is removed from an effective crimped inner diameter of the sleeve.

* * * * *